(12) United States Patent
Kucmerowski et al.

(10) Patent No.: US 7,756,257 B2
(45) Date of Patent: Jul. 13, 2010

(54) SIP ENABLED DEVICE IDENTIFICATION

(75) Inventors: Dennis L. Kucmerowski, Delray Beach, FL (US); Peggy Marie Stumer, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1260 days.

(21) Appl. No.: 10/978,168

(22) Filed: Oct. 29, 2004

(65) Prior Publication Data

US 2006/0092917 A1    May 4, 2006

(51) Int. Cl.
*H04M 1/64* (2006.01)
(52) U.S. Cl. .................. 379/88.17; 379/45; 379/88.11; 379/207.12; 370/352
(58) Field of Classification Search .................. 379/142, 379/67, 88.17, 88.11, 45, 207.12; 370/352, 370/432
See application file for complete search history.

(56) References Cited

U.S. PATENT DOCUMENTS 6,937,699 B1 *   8/2005   Schuster et al. ............ 379/67.1
7,272,637 B1 *   9/2007   Himmelstein ............... 709/217
2005/0083911 A1 *   4/2005   Grabelsky et al. ........... 370/352

* cited by examiner

*Primary Examiner*—Fan Tsang
*Assistant Examiner*—Simon King

(57) ABSTRACT

An object of the invention is to associate a DID/public or non-DID/private telephone number and/or reachable location information with a SIP Enabled Device. More specifically, an embodiment of the invention is directed to providing an additional data parameter comprising alphanumeric data, as a "Display_ID" parameter. The parameter includes information including a DID/public telephone number non-DID/private number and/or location information that is specific to the SIP user endpoint and is different from the SIP URI host address/user information (terminal name and/or terminal number). In another embodiment, a first SIP Enabled Device accesses the local Display_ID and includes the Display_ID in a communication request. A second SIP Enabled Device is capable of processing the incoming communication request, extracting the Display_ID parameter, and displaying the Display_ID associated with the first SIP Enabled Device on the text display of the second SIP Enabled Device.

22 Claims, 8 Drawing Sheets

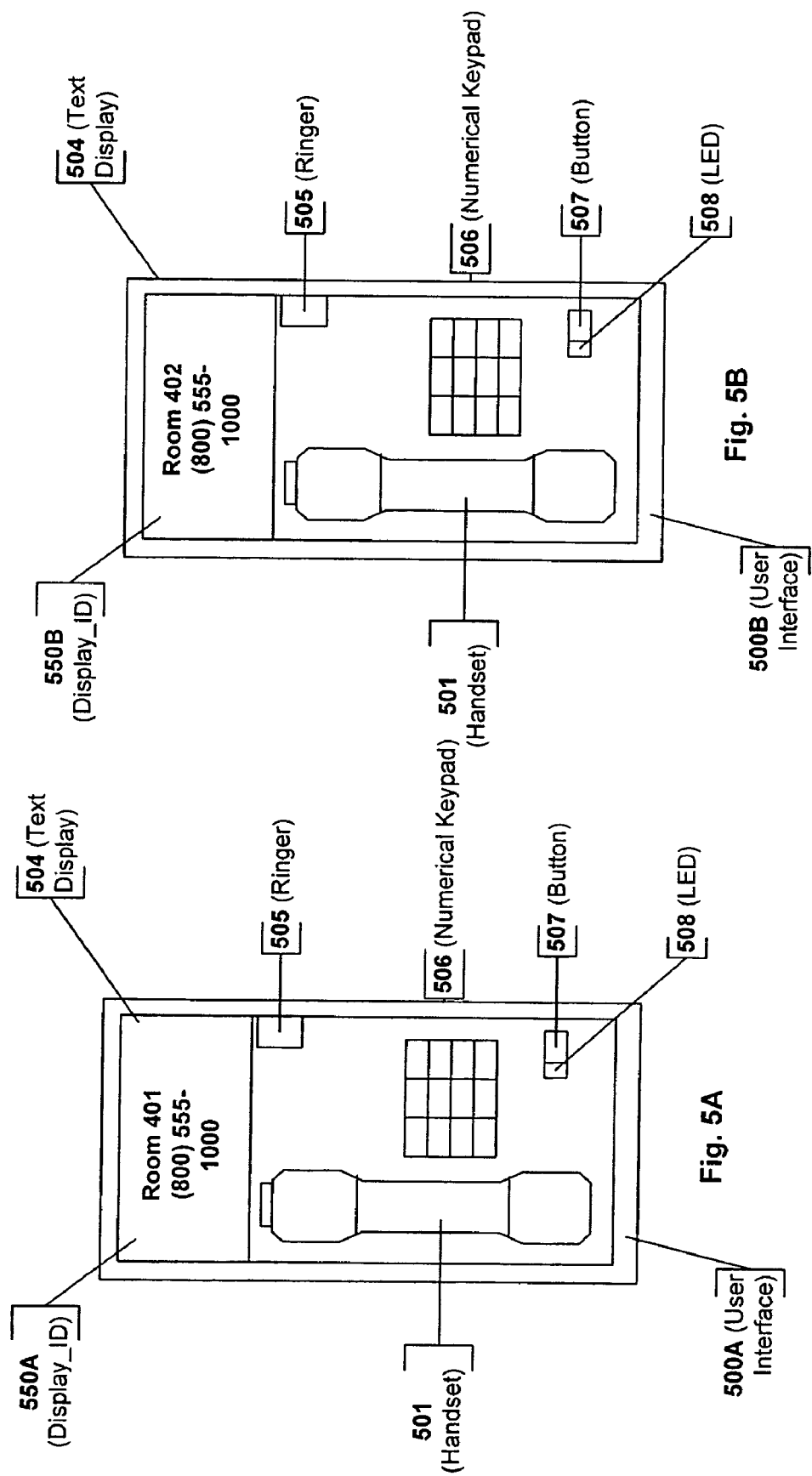

SIP ENABLED DEVICE IDENTIFICATION

FIELD OF INVENTION

This invention relates generally to the field of telecommunication data management and more specifically to an apparatus, method and system for identifying a Session Initiation Protocol (SIP) Enabled Device.

BACKGROUND INFORMATION

In traditional circuit-switched networks, such as the Public Switched Telephony System ("PSTN"), each user endpoint is connected to at most one switching system. In a business enterprise, a business telephone is connected to a single Private Branch Exchange ("PBX"). A PBX is an intelligent switching point within a circuit-switched network that is responsible for routing calls to a plurality of internal nodes or public destinations via a single PSTN switching system.

Newer telephony networks that employ packet-switching technologies are growing in popularity. In particular, packet-switched telephony networks that use the Internet Protocol (IP) as a network protocol for transmitting and receiving voice data are becoming more prevalent. These so-called Internet Telephony networks have the potential to offer new features and services that are currently unavailable to subscriber of circuit-switched telephony networks. Conceptually, IT Networks differ from the PSTN systems in that they generally transmit voice data exchanged between two subscriber endpoints, according to an IP format. More specifically, they encapsulate voice data into data packets, which are transmitted according to an IP format in the same manner as textual data is transmitted from one computer to another via the internet.

The Session Initiation Protocol (SIP) is one of several protocols that may be used with the Internet Protocol to support Internet Telephony applications. The SIP specification is defined in the Internet Engineering Task Force (IETF) Request for Comments (RFC) 3261, dated June 2002; the disclosure of which is incorporated herein by reference in its entirety. SIP is an application-layer control protocol for creating, modifying, and terminating sessions between networked endpoints, which are referred to as SIP Enabled Devices, User Agents or simply SIP endpoints.

As discussed above, SIP Enabled Devices implement a network communication protocol, wherein a communication session is established for two endpoints to transmit and receive data. As such, each SIP Device in a SIP network is assigned a unique SIP address or terminal name, which is defined in a SIP Universal Resource Identifier (URI). The format of a SIP URI is similar to that of an email address, which typically includes a user name "at" a domain name, for example "sip:alice@siemens.com." SIP URI data is placed into header fields of SIP messages, for example to identify a sender and a receiver of the SIP message. For secure communications, the SIP Specification also defines a SIPS URI, for example "sips:alice@siemens.com." Accordingly, when a SIPS URI is used the SIP Enabled Device associated with the SIP URI may implement an encryption protocol for transmitting data in a secure communication session. It should be noted that the SIPS URI protocol may be used interchangeably with SIP URI protocol, in the examples that follow.

The SIP specification defines several types of communication resources implemented for establishing and maintaining SIP based communication sessions among SIP Enabled Devices, which include SIP Registrars, SIP Redirect Servers, and SIP Proxies. These SIP communication resources are responsible for sending, receiving, routing, and relaying SIP messages among SIP Enabled Devices.

SIP Proxy Servers perform a variety of functions in SIP networks, such as coordinating data routing for SIP session requests to a particular SIP network subscriber current location; authenticating and authorizing SIP network users for particular services; implementing call-routing policies, as well as providing additional functionality to SIP network users. A conventional SIP endpoint is capable of identifying and displaying the terminal name and/or terminal number (Host Address/user information) of a subscriber's endpoint/telephone based on SIP URI address information. More specifically, a SIP endpoint is configured to process the SIP URI address information to identify an incoming telephone/endpoint and register the endpoint to a proxy/back-to-back user agent. By way of example only, analysis of the SIP URI data may determine user information such as the terminal number associated with an endpoint, such as extension 4444 assoicated with a terminal. However, the information stored within a conventional SIP Enabled Device and displayed to a user are parameters used for data routing. They do not necessarily correspond to a Direct Inward Dial (DID)/public number (e.g., the main number for a business, a DID number) or a non-DID/private number (e.g., one-to-six digits, often displayed as an extension number which cannot be accessed directly by a public terminal. Conventional SIP Enabled Devices may also display the host address of the endpoint, which depending on the implementation may be deceptively similar to a viable telephone number (e.g., 561-55X-1234 or subscriberA@company.com). However, this data, the terminal number and terminal name, from the SIP URI are used for data routing by the SIP Enabled Devices involved in a communication session.

The SIP URI data is stored in a SIP Enabled Device and can be used as part of information that is displayed to a user. For example, in a conventional SIP Enabled Device, the SIP Enabled Application, a controller program stored in a device's memory and executed by a SIP Enabled Device's processor, may parse the stored SIP URI associated with the device and display a terminal name and/or the terminal number. However, as discussed above this information is used in data routing between communication nodes in a network and may or may not correspond to a public number (DID) or a private number (non-DID).

SUMMARY OF THE INVENTION

An object of the invention is to associate independent destination information to a DID/public number or a non-DID/private number and/or private SIP destination information with a SIP Enabled Device. More specifically, an embodiment of the invention is directed to providing an additional data parameter comprising an alphanumeric data word, as a "Display_ID" parameter. The Display_ID parameter may be stored locally within the memory of the SIP Enabled Device. The parameter includes information including a non-DID telephone number and/or location information that is specific to the SIP user endpoint and is different from the SIP URI host address/user information (terminal name and/or terminal number).

In another embodiment, a first SIP Enabled Device accesses the local Display_ID parameter and includes the Display_ID as part of a communication session request. The created request is then transmitted to a second SIP Enabled Device. The second SIP Enabled Device is capable of processing the incoming communication session request, extracting the Display_ID parameter, and displaying the Display_ID associated with the first SIP Enabled Device on the text display of the second SIP Enabled Device.

BRIEF DESCRIPTION OF THE DRAWINGS

FIGS. 5A and 5B illustrate diagrams of two user interfaces according to a first embodiment of the invention.

DETAILED DESCRIPTION OF THE INVENTION

In the following description of the various embodiments of the invention, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Overview

Generally, under the present invention, a SIP Enabled Device is a hardware device implementing a SIP Enabled Application module that facilitates communication sessions based on the SIP Internet Telephony communication protocol. Examples of SIP Enabled Devices include telephones, personal computers, and multimedia conferencing systems or any other type of device capable of implementing the SIP communication protocol.

Figure 1:
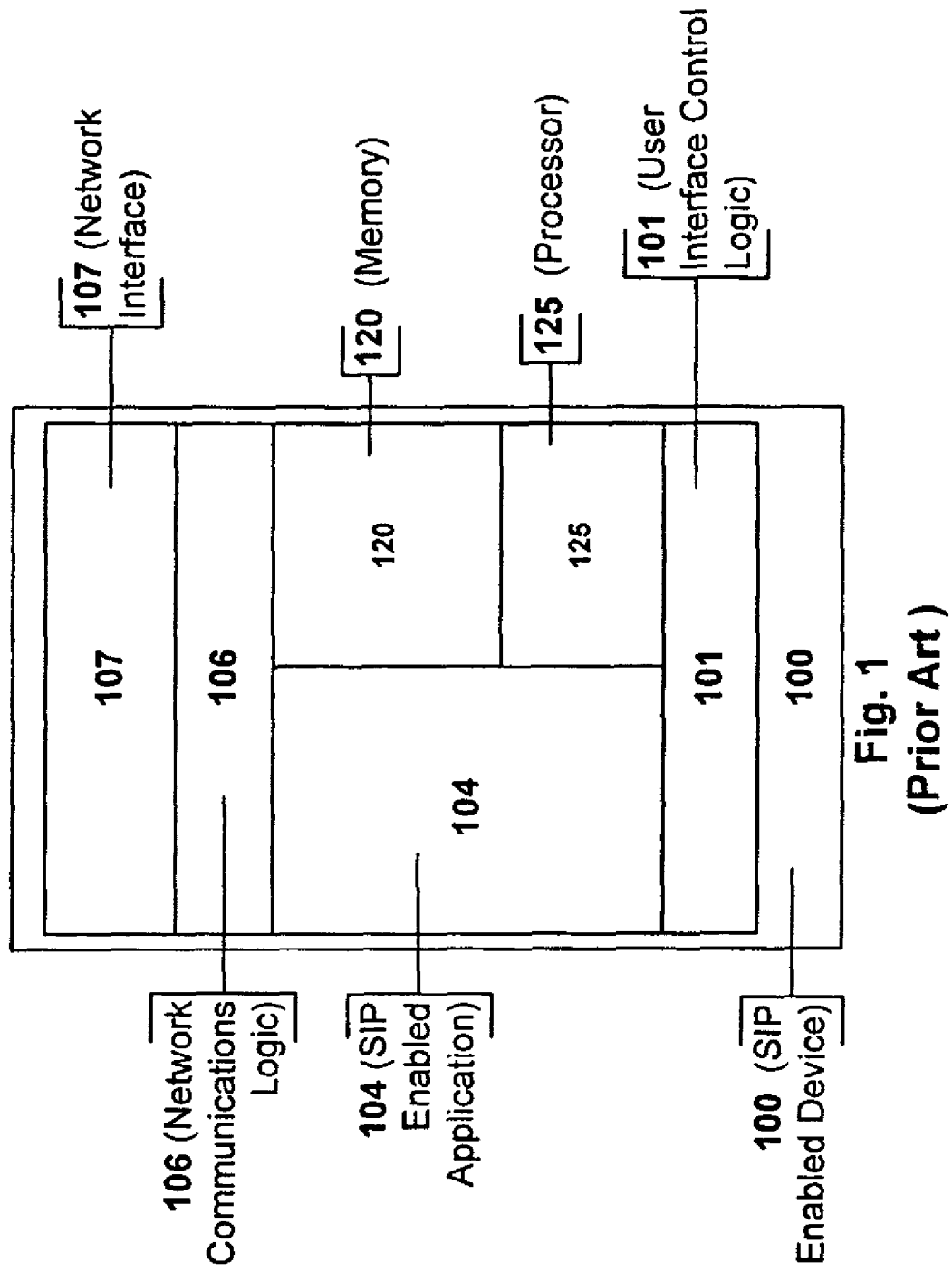
FIG. 1 illustrates a block diagram of software modules and hardware components implemented as a conventional SIP Enabled Device.
Figure 2:
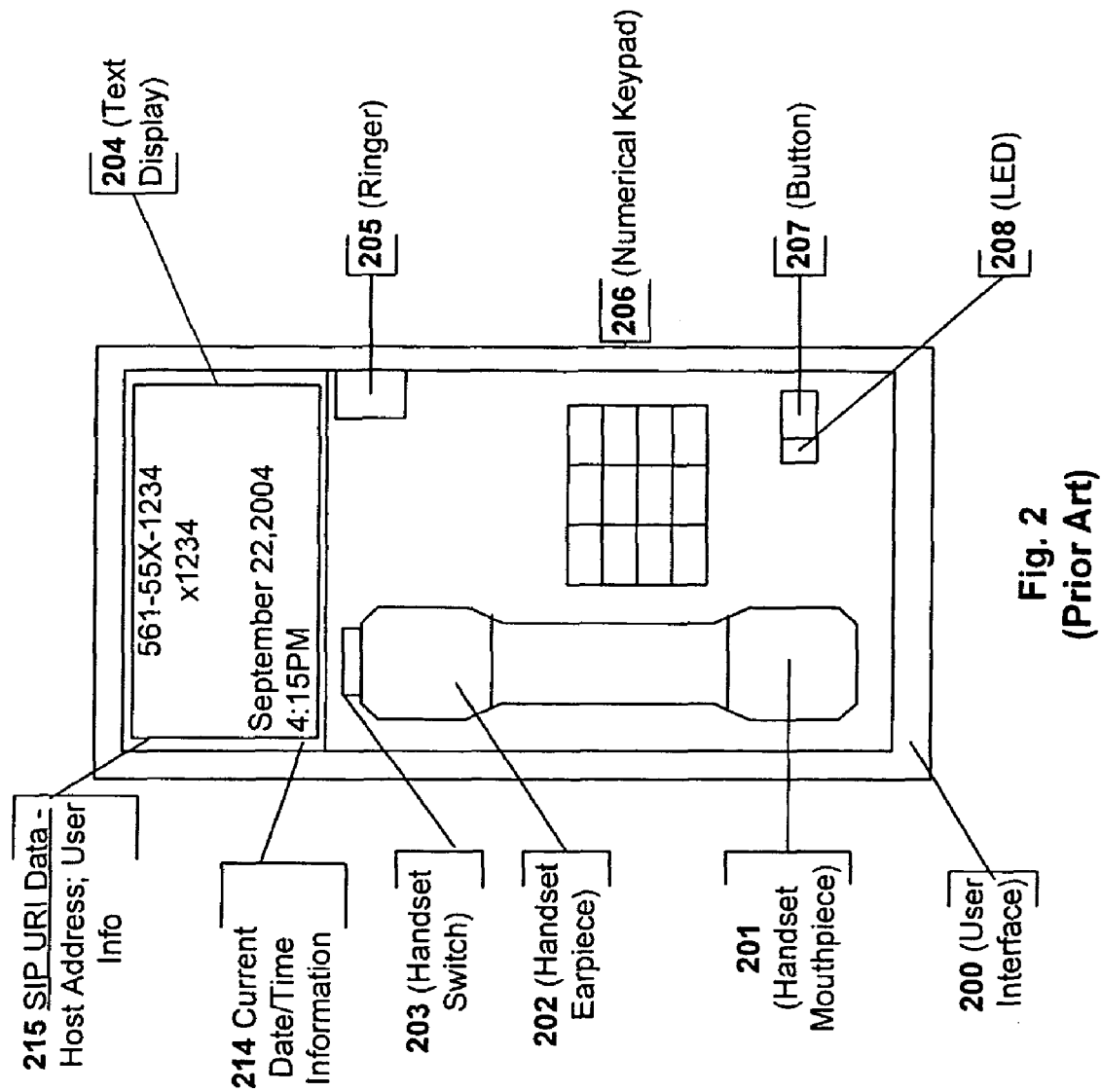
FIG. 2 illustrates a diagram of a user interface of a conventional SIP Enabled Device.
Figure 4:
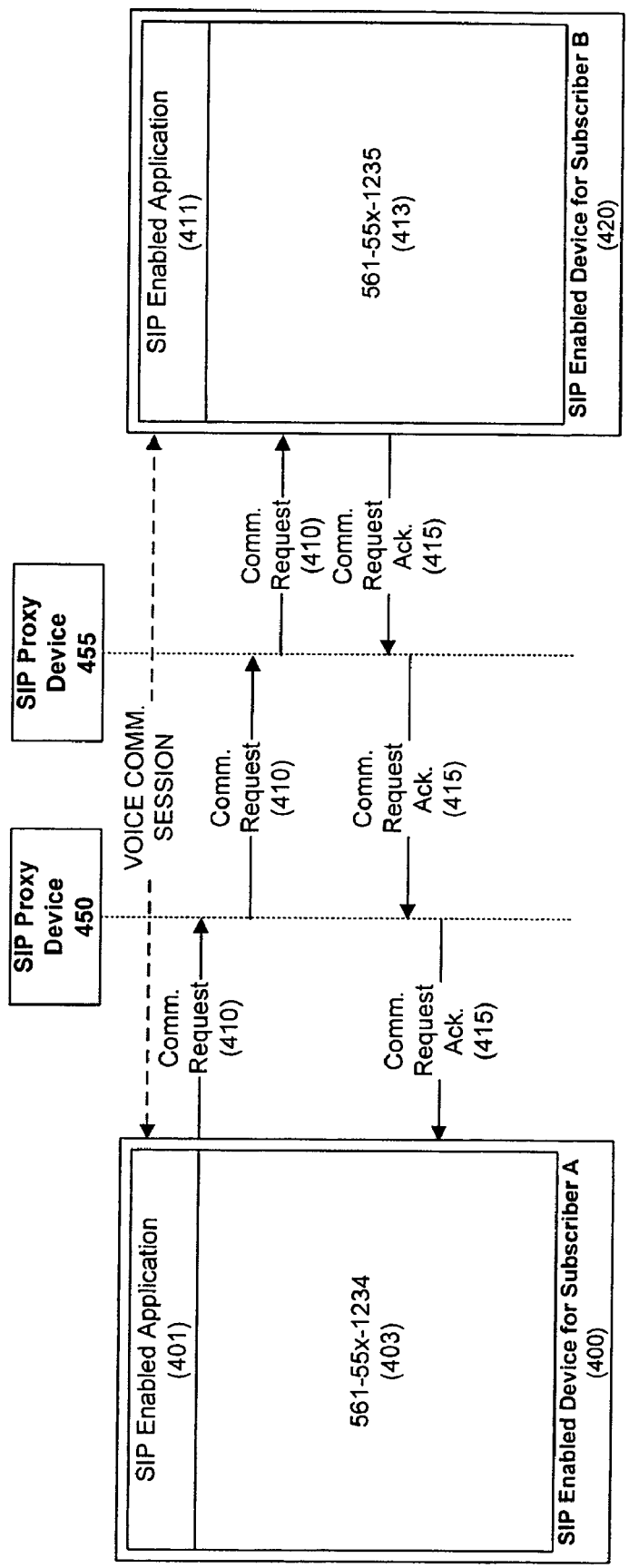
FIG. 4 illustrates a diagram of a conventional communication session message exchange between two SIP Enabled Devices.

Referring to FIG. 1, a conventional SIP Enabled Device 100 is comprised of a User Interface Control Logic module 101 that interfaces with a user interface (an exemplary user interface is shown in FIG. 2 and discussed below). The User Interface Control Logic module 101 also interfaces with a SIP Enabled Application 104. The SIP Enabled Application 104 implements a controller coordinating the various modules interacting within a single SIP Enabled Device 100 to send and receive SIP messages (as shown in FIG. 4 and discussed below). The SIP Enabled Application 104 is also responsible for processing data from SIP communication messages and controlling additional functionality associated with the SIP Enabled Device 100. The SIP Enabled Application module 104, the Network Communication Logic are modules that are stored on the SIP enabled device 100 in memory 120 and executed by processor 125.

Further, the SIP Enabled Application 104 also interfaces with Network Communications Logic module 106 to send and receive non-SIP messages (not shown). The Network Communications Logic module 106 implements data management and communications protocols for communicating with other network resources. Network Communications Logic module 106 interfaces with Network Interface 107, which is used to physically interface to a network (an exemplary network is shown in FIG. 3 and discussed below) that provides connectivity with other networked devices.

FIG. 2 shows an example of a User Interface 200 for a conventional SIP Enabled Device used for Internet telephony applications. User Interface 200 is comprised of components including: handset mouthpiece 201, handset earpiece 202, handset switch 203, text display 204, ringer 205, and keypad 206, as well as user input button 207 and an LED indicator 208. A user physically manipulates the User Interface 200 components to operate the SIP Enabled Device 200 in a manner that is similar to a conventional telephone.

The conventional SIP Enabled Device 200 may display data extracted from a SIP URI corresponding to the specific SIP Enabled Device. More specifically, one aspect of the SIP Enabled Device's SIP Enabled Application 104 is to maintain current date and/or time information 214 and display the data on text display 204. Also, the SIP Enabled Application 104 may be configured to extract Host Address and/or User Information 215—data routing information, such as "561-55X-1234" and "x1234" (Terminal Number and Terminal Name) data from the SIP URI (a listing of SIP Enabled device data specific to a terminal that is used to facilitate data transmissions) for the SIP endpoint. However, as will be described in greater detail below, the Terminal Name and Terminal Number correspond to data-routing control information and do not necessarily correspond to a non-Direct Inward Dial(DID)/private telephone number.

Figure 3:
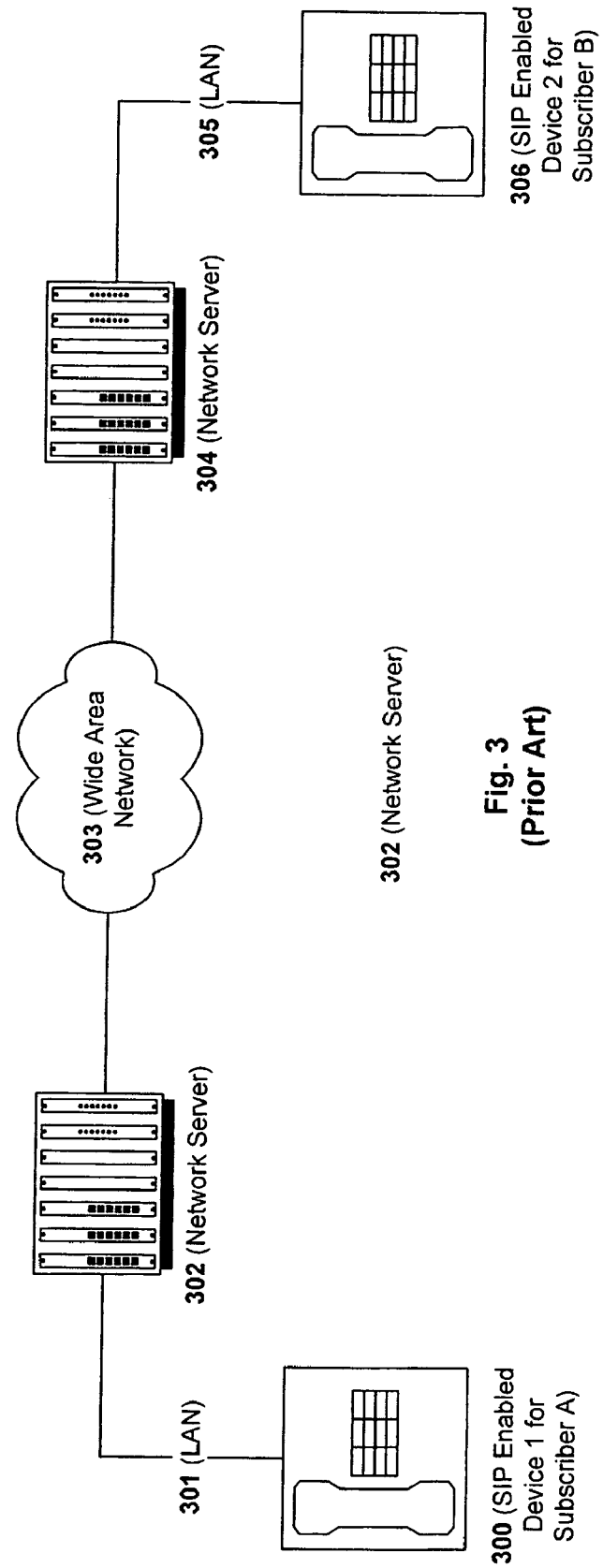
FIG. 3 illustrates an exemplary network of SIP Enabled Devices, connected to a network for use in a SIP Enabled Internet Telephony application.

FIG. 3 depicts a conventional SIP Enabled Device network diagram illustrating exemplary devices that may be connected in a SIP network. In this example, subscriber A's SIP Enabled Device 300 is connected to a Local Area Network (LAN) 301. LAN 301, in turn, is connected to Network Server 302, which is also connected to Wide Area Network 303. Wide Area Network 303 is also connected to Network Server 304, wherein the Network Server 304 is connected to LAN 305, which is also connected to subscriber B's SIP Enabled Device 306. For illustrative simplicity, Network Servers 302 and 304 each perform the function of a SIP Proxy Server, a SIP Redirect Server, and a SIP Registrar; the functionality of which are defined in the SIP protocol specification. These Network Servers also contain additional functionality that is required for the SIP Enabled Devices to communicate; for example a Domain Name System (DNS) server, a Dynamic Host Control Protocol (DHCP) server, and a Lightweight Directory Access Protocol (LDAP) server.

FIG. 4 illustrates a generic exchange of data messages during SIP communication session creation. The SIP session shown results from subscriber A's SIP Enabled Device 400 initiating a voice call to subscriber B's SIP Enabled Device 420. For illustrative simplicity, only the SIP Enabled Application (401/411) for each SIP Enabled Device is shown. Prior to placing the voice call, subscriber A has configured the SIP Enabled Device 400 with a SIP address of "561-55x-1234" 403 (host address data from the SIP URI) and subscriber B has configured the SIP Enabled Device 420 with a SIP address of "561-55x-1235" 413.

During the SIP communication session, each SIP Enabled Application (401/411) uses these SIP addresses (403, 413) for routing data transmissions, and thereby establish and maintain a communication session. This is achieved by the respective SIP Enabled Applications interacting with a User Interface on the SIP Enabled Device to sample, encapsulate voice data for transmission on one SIP Enabled Device, while processing transmitted data packets and synthesizing the corresponding voice data on the other SIP Enabled Device. With regard to data transmission, subscriber A's SIP Enabled Application 401 communicates with subscriber B's SIP Enabled Application 411 by inserting " " the address (561-55x-1235) 413 into the "To" header field of a SIP Communication Request (Comm. Request) message 410. Accordingly, in response subscriber B's SIP Enabled Application 411 prepares a Communication Request Acknowledgement message 415 inserting "(561-55x-1234)" 403 into the To header field of a response message. (The message exchange between the SIP Enabled Devices 400 and 420 has been modified for the purposes of illustration and simplification, for a more detailed description of the actual SIP communication protocol refer to RFC 3261.)

FIGS. 5A and 5B illustrates a diagram of two user interfaces 500A and 500B for SIP Enabled Devices according to an embodiment of the invention. As discussed above, the conventional SIP Enabled Device user interface 200 may display the Host Address/User Information on the text display unit (shown in FIG. 2). The SIP Enabled Device incorporates some of the elements associated with the conventional SIP Enabled Device, such as handset 501, ringer 505, numerical keypad 506, input button 507, and indicator LED 508. According to the invention, the SIP Enabled Device implements user interfaces 500A and 500B that include an additional alphanumeric data parameter stored locally within device 500A and 500B—a Display_ID parameter 550A and 550B.

The Display_ID parameter 550 is a non-DID that illustrates the terminals reachable location information, in FIGS. 5A and 5B, "Room 401" and "Room 402" respectively. The Display_ID information is independent of the terminal name and terminal number stored in the SIP URI for each of the devices. Depending the actual implementation, the SIP Enabled Application or another application program may be utilized to remotely or locally update the Display_ID parameter with additional user information. The SIP Enabled Application is programmed to access the local Display_ID parameter 550A/550B and display it on the SIP Enable Device's text display 504. Furthermore, in addition to a non-DID, the Display_ID data parameter 550 may include reachable location information, (e.g., Room 401-800-555-1000).

As illustrated in FIGS. 5A and 5B, the SIP Enabled Application may be configured to display the Display_ID parameter 550A and 550B. Depending on the actual implementation, the SIP Enabled Application may be configured to display the Host Address/User Information associated with a terminal in addition to the Display_ID parameters on text display 504. Depending upon the actual implementation, the Display_ID is displayed during the idle state or during use of the terminal. Furthermore, the SIP Enabled Application may assign a priority to what it displays, effectively displaying the Terminal Name and/or Terminal Number only when a Display_ID parameter is not assigned/available.

Figure 6A:
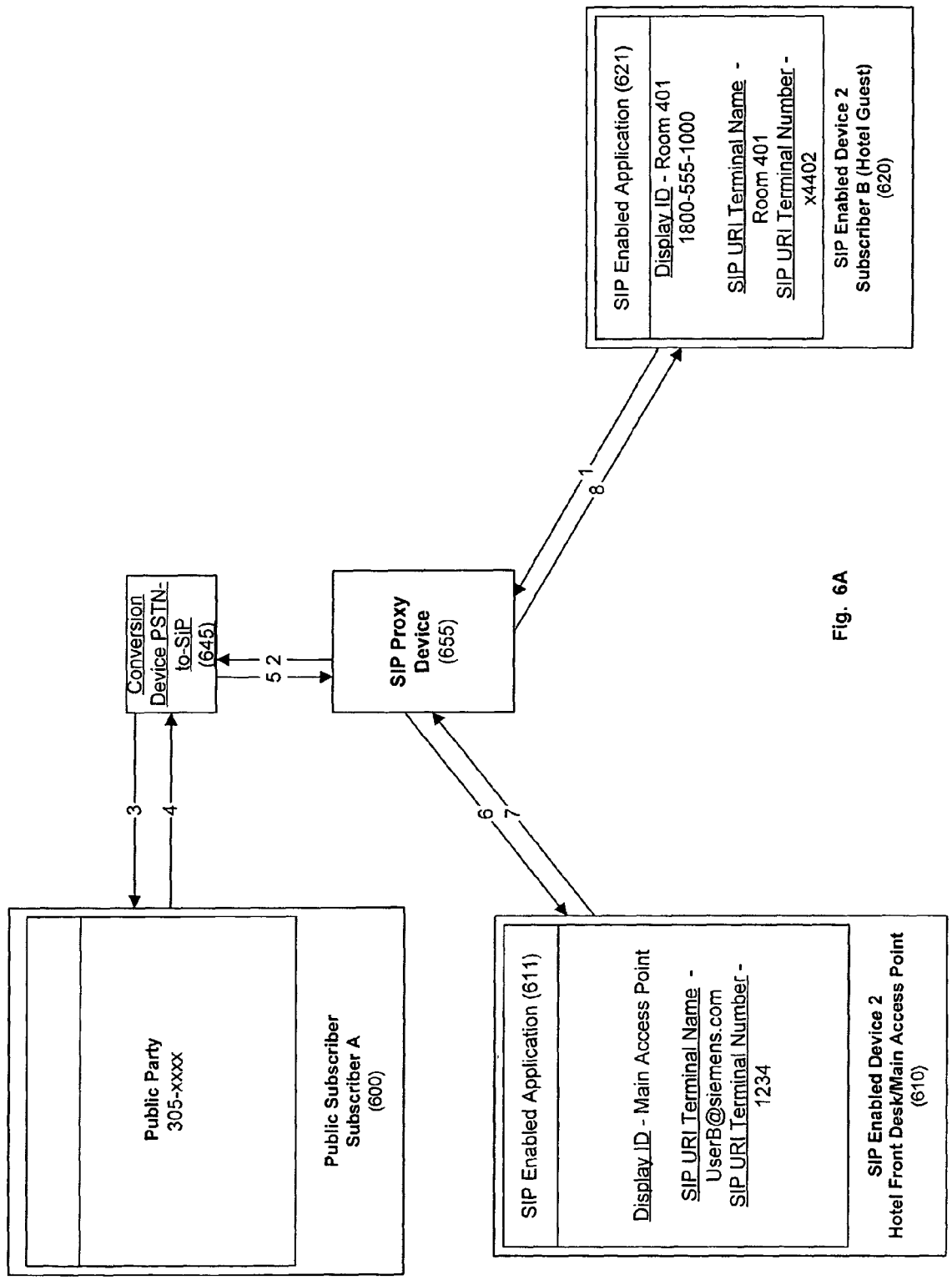
FIG. 6A illustrates a SIP Enabled Device communication flow diagram according to the first embodiment of the invention.

FIG. 6A illustrates a non-limiting application of the embodiment described in FIG. 5. For the purposes of illustration, the embodiment will be described as applied to the context of a hotel telecommunication network context that includes a Public Party 600 (Subscriber A), SIP Enabled Device 610 (hotel front desk/main access point) and SIP Enabled Device 620 (Subscriber B) that are connected with a Conversion Device converting both SIP data messages into PSTN voice signals and PSTN voice signals into SIP data messages, which may be directed through SIP Proxy Device 655. Subscriber B 620 arrives at a hotel and decides to contact Subscriber A 600.

Accordingly, Subscriber B dials Subscriber's A telephone number and gets an answering machine. (For the purposes of this discussion, this process has been illustrated in steps 1-3 in FIG. 6A). If Subscriber B has a conventional SIP Enabled Device (as shown in FIG. 2), Subscriber B may look at the text display unit 204 and leave the SIP URI data 215 (561-55X-1234) as his contact information in a message on the Subscriber A's answering machine. However, if Subscriber B has the SIP Enabled Device 620 implementing the user interface 550A/550B as shown in FIGS. 5A and 5B, he is able to leave viable contact information, corresponding to the Display_ID parameter. For example, as shown in FIG. 6A, Subscriber B may leave data corresponding to his Room number "Room 401" and the hotel's main contact number "1-800-555-1000." Subsequently, according to an advantageous aspect of the invention, Subscriber A 600 may use the information left on his answering machine to contact Subscriber B 620 and establish a communication session, as shown in steps 4-8, by calling the main contact number (800-555-1000) and giving Subscriber B's room number (Room 401) to the Hotel Front Desk 610. Further, depending on the implementation, Subscriber B may also see a reachable location (e.g., Room 402, West wing, $21^{st}$ Floor, etc . . . ) displayed along with the DID.

Figure 6B:
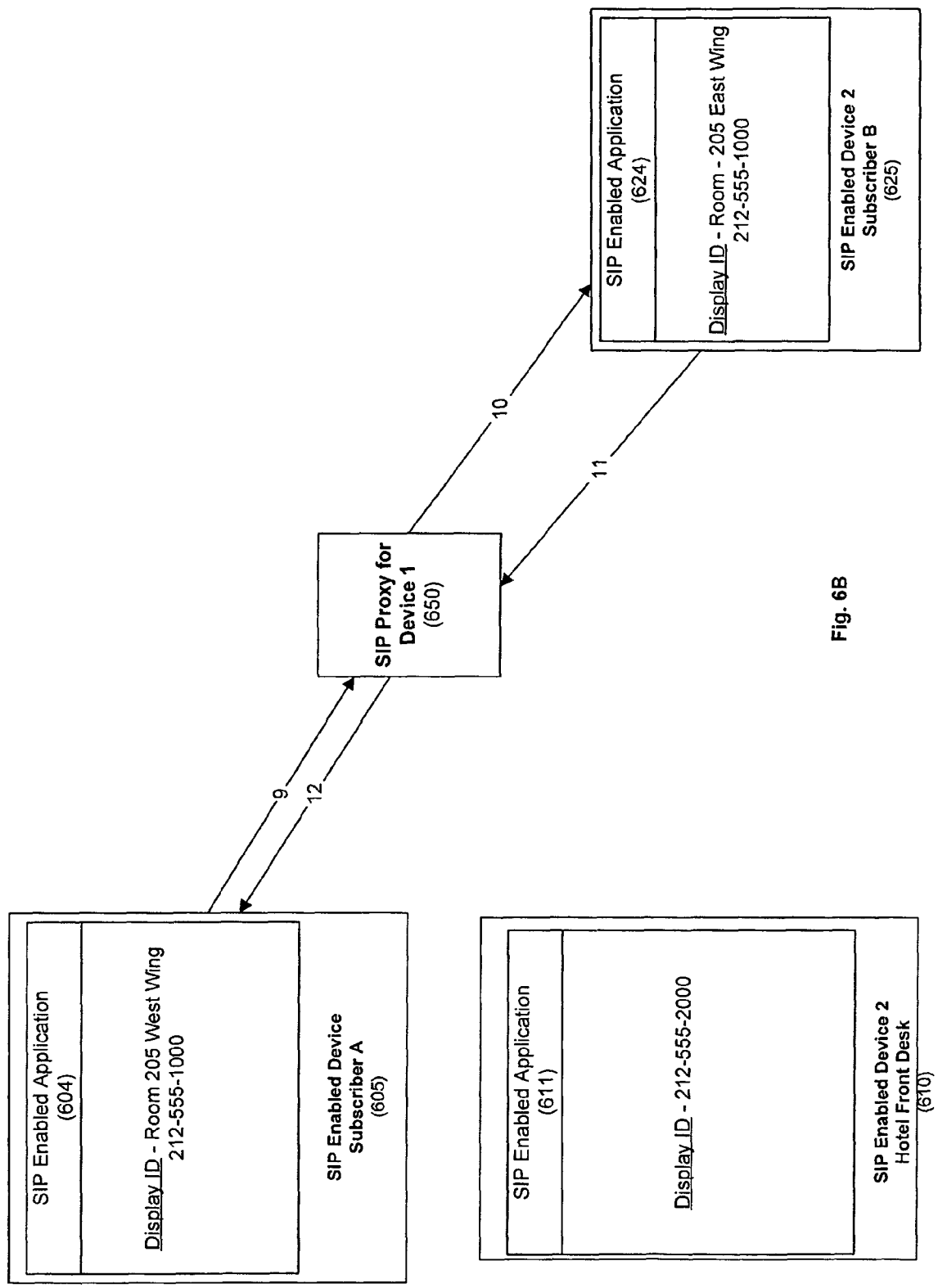
FIG. 6B illustrates a SIP Enabled Device identification method according to a second embodiment of the invention.
Figure 6C:
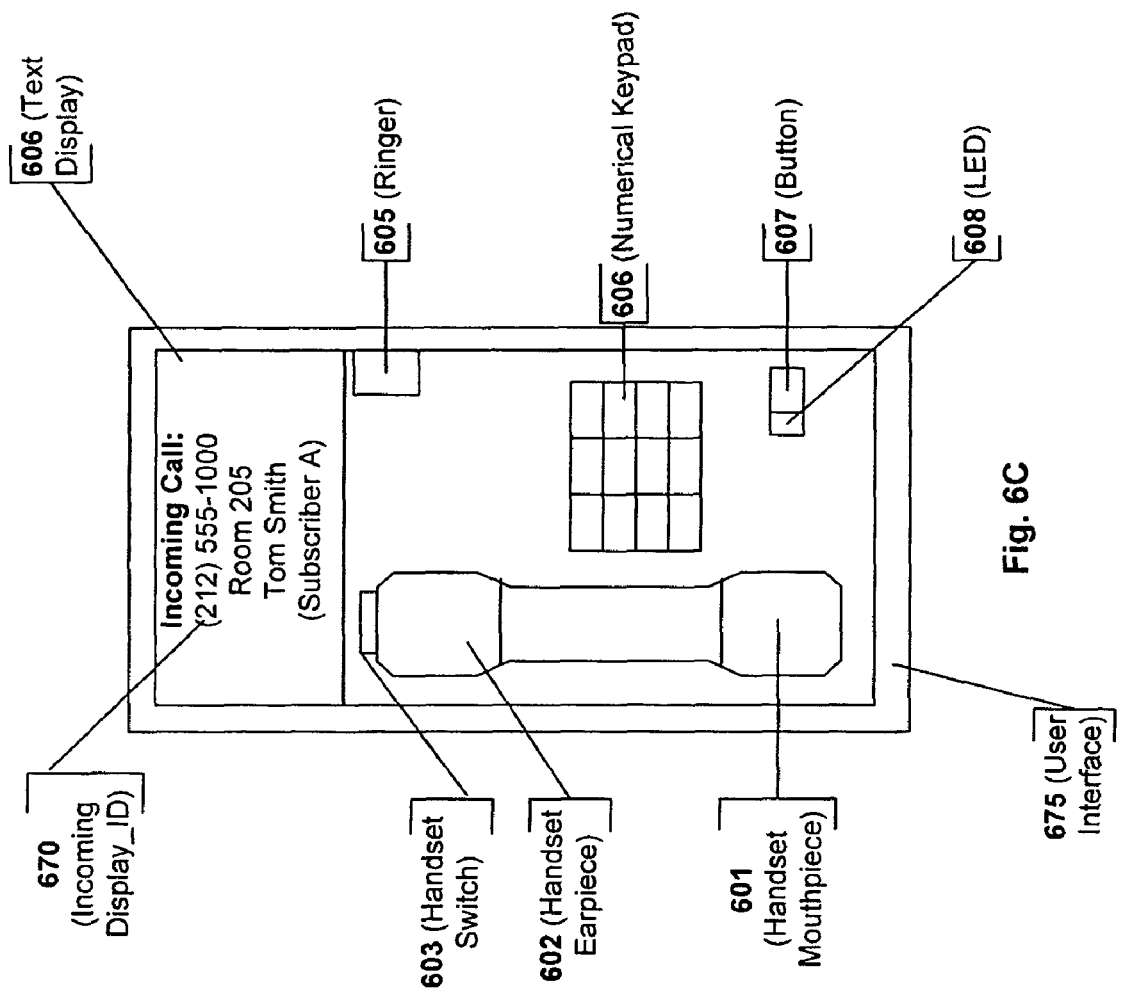
FIG. 6C illustrates a diagram of a user interface according to the second embodiment of the invention.

According to another embodiment of the invention illustrated in FIG. 6B, the Display_ID parameter may be included as part of a communication session request. Continuing with the hotel application of FIG. 6A, in FIGS. 6B and 6C illustrate internal hotel SIP Enabled Device user Subscriber A 605 and Subscriber B 625. In FIG. 6B, Subscriber A 605 requests a communication session with Subscriber B 625. Subscriber A's SIP Enabled Application 604 may be configured to extract the Display_ID data (Room 205 West Wing 212-555-1000) from the local SIP Enabled Device 605 and include the information as part of a communication session request transmitted in steps 9 and 10 (shown in FIG. 6B) to Subscriber B 625.

Subscriber B's SIP Enabled Application 624 may be configured to parse the communication request and display the Display_ID parameters associated with Subscriber A's terminal 605. FIG. 6C illustrates an exemplary user interface 675 that displays the incoming Display_ID information 670 on text display 606. Based on the information displayed Subscriber B 625 can decide whether or not to accept the communication request and establish a communication session with Subscriber A 605, as in steps 11 and 12 in FIG. 6B. By way of example only, Subscriber B 625 may see a text display as shown in FIG. 6C, that provides a Subscriber Display_ID data 670 extracted from a communication session request message associated with the "Incoming Call," such as a non-DID/private number and/or a DID/public number, corresponding to the call originator, and/or a name associated with the DID.

In an alternate embodiment of the invention, the SIP Enabled Device receiving a communication session request with Display_ID data may store incoming data in the memory of the device. Such data may be arranged according to any number of parameters. By way of example only, a Subscriber may access stored incoming Display_ID data based on whether the incoming call was answered or missed, or whether the data corresponds to a new entry or a previously recorded entry.

The many features and advantages of the present invention are apparent from the detailed specification, and thus, it is intended by the appended claims to cover all such features and advantages of the invention which fall within the true spirit and scope of the invention. Furthermore, since the embodiments described above are exemplary, numerous modifications and variations will readily occur to those skilled in the art, and the invention should not be limited to the exact construction and operation illustrated and described herein.

We claim:

1. A method for implementing a first SIP Enabled Telephone comprising:
    associating an identification parameter with the first SIP Enabled Telephone independent from SIP URI data parameters terminal name and terminal number;
    storing the identification parameter within memory of the first SIP Enabled Telephone;
    accessing the identification parameter;
    encapsulating the identification parameter within a communication request from the first SIP Enabled Telephone; and
    transmitting the communication request to a second SIP Enabled Telephone for said second telephone to process said request.

2. The method of claim 1, further comprising: displaying the identification parameter on a terminal display associated with the first SIP Enabled Telephone.

3. The method of claim 2, further comprising: displaying the terminal name associated with the first SIP Enabled Telephone.

4. The method of claim 2, further comprising: displaying the terminal number associated with the first SIP Enabled Telephone.

5. The method of claim 1, further comprising:
    receiving an incoming communication request;
    processing the data associated with the incoming communication request;
    determining whether the incoming communication request includes an identification parameter that is independent from the SIP URI data parameters terminal name and terminal number and is associated with a third SIP Enabled Telephone that initiated the incoming communication request; and
    assigning a priority to displaying the independent identification parameter and the SIP URI data parameters terminal name and terminal number.

6. The method of claim 5, further comprising:
    displaying the identification parameter associated with the third SIP Enabled-Telephone on the first SIP Enabled Telephone that received the communication request in the event that the processed data contains the independent identification data.

7. The method of claim 5, further comprising:
    displaying the terminal name associated with the third SIP Enabled Telephone only if the independent identification parameter associated with the second SIP Enabled Telephone does not exist.

8. The method of claim 5, further comprising:
    displaying the terminal number associated with the third SIP Enabled Telephone only if the independent identification parameter associated with the second SIP Enabled Telephone does not exist.

9. The method of claim 1, wherein the identification parameter comprises: a directly inward dial telephone number or non DID/private number.

10. The method of claim 1, wherein the identification parameter comprises: a physical location.

11. The method of claim 1, further comprising:
    storing independent identification data associated with at least a third SIP Enabled Telephone.

12. An apparatus configured to facilitate identifying a first SIP Enabled Telephone comprising:
    a memory unit, a processing unit disposed in communication with said memory unit, said processing unit configured to:
        associate an identification parameter with the first SIP Enabled Telephone independent from SIP URI data parameters terminal name and terminal number;
        store the identification parameter within the memory of the first SIP Enabled Telephone;
        access the identification parameter;
        encapsulate the identification parameter within a communication request from the first SIP Enabled Telephone; and
        transmit the communication request to a second SIP Enabled Telephone for said second telephone to process said request.

13. The apparatus of claim 12, wherein the processor is configured to cause a display of the identification parameter on a terminal display associated with the first SIP Enabled Telephone.

14. The apparatus of claim 13, wherein the processor is configured to cause a display of the terminal name associated with the first SIP Enabled Telephone.

15. The apparatus of claim 13, wherein the processor is configured to cause a display of the terminal number associated with the first SIP Enabled Telephone.

16. The apparatus of claim 12, wherein the processor is configured to:
    receive an incoming communication request;
    process the data associated with the incoming communication request;
    determine whether the incoming communication request includes an identification parameter that is independent from the SIP URI data parameters terminal name and terminal number and is associated with a third SIP Enabled Telephone that initiated the incoming communication request; and
    assign a priority to displaying the independent identification parameter and the SIP URI data parameters terminal name and terminal number.

17. The apparatus of claim 16, wherein the processor is further configured to cause a display of the identification parameter associated with the third SIP Enabled Telephone on the first SIP Enabled Telephone receiving the communication request in the event that the processed data contains the independent identification data.

18. The apparatus of claim 16, wherein the processor is configured to cause a display of the terminal name associated with the third SIP Enabled Telephone only if the independent identification parameter associated with the third SIP Enabled Telephone does not exist.

19. The apparatus of claim 16, wherein the processor is configured to cause a display of the terminal number associated with the third SIP Enabled Telephone only if the independent identification parameter associated with the third SIP Enabled Telephone does not exist.

20. The apparatus of claim 12, wherein the identification parameter comprises: a direct inward dial/public or non-DID/private telephone number.

21. The apparatus of claim 12, wherein the identification parameter comprises: a physical location.

22. The apparatus of claim 12, wherein the processor is configured to cause the first SIP Enabled Telephone to store a roster of independent identification data within the memory.

* * * * *